Dec. 7, 1937.  G. A. LYON  2,101,318
ORNAMENTAL BEAD AND METHOD OF APPLYING THE SAME TO ORNAMENTAL WHEEL DISKS
Filed Dec. 22, 1934
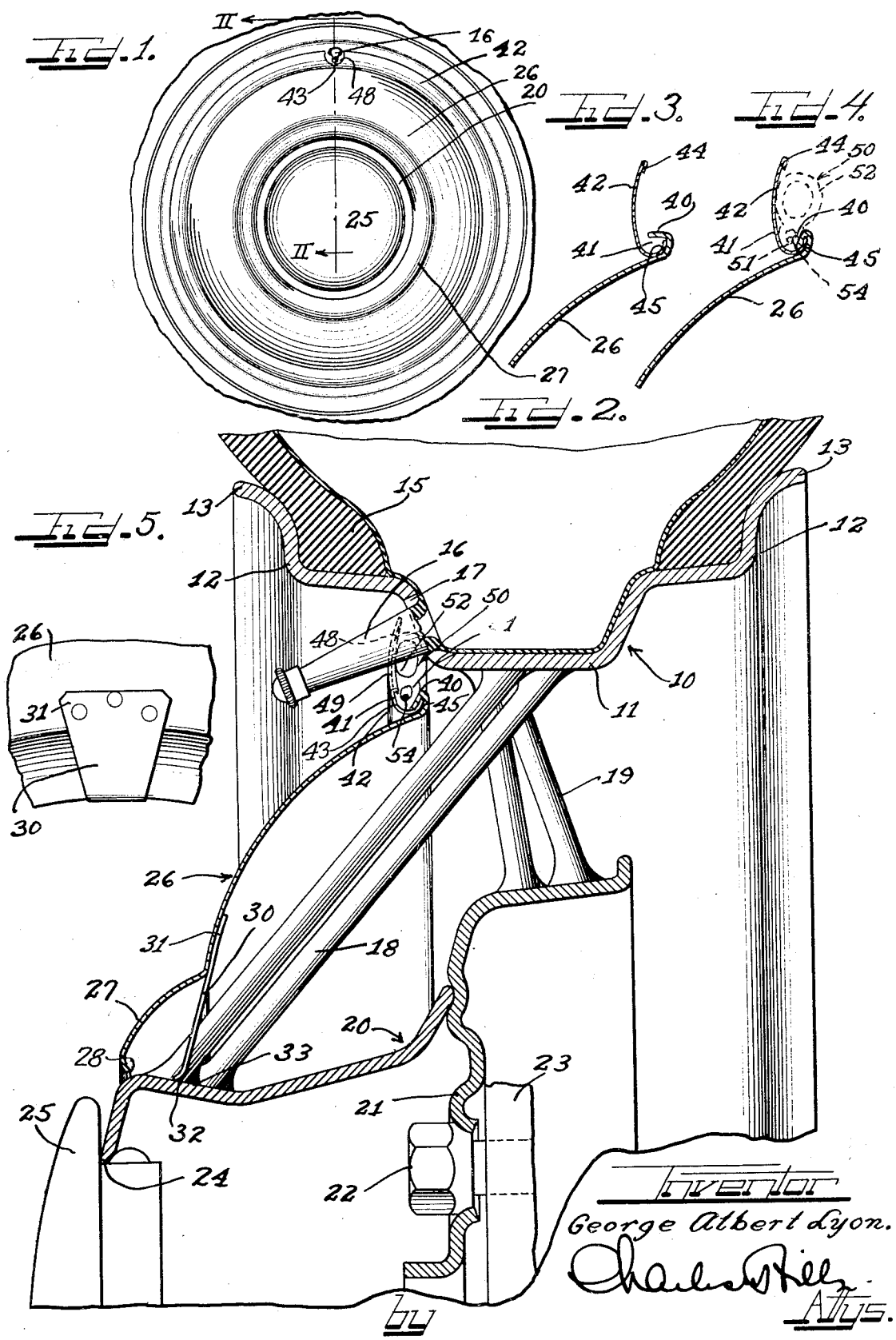
Inventor
George Albert Lyon Patented Dec. 7, 1937

2,101,318

UNITED STATES PATENT OFFICE 2,101,318

ORNAMENTAL BEAD AND METHOD OF APPLYING THE SAME TO ORNAMENTAL WHEEL DISKS

George Albert Lyon, Allenhurst, N. J.

Application December 22, 1934, Serial No. 758,809

8 Claims. (Cl. 41—10)

This invention relates to an ornamental bead and a novel method of applying the same to an ornamental wheel disk.

An object of this invention is to provide a simple and inexpensive method of applying a bead to an ornamental wheel disk without detracting from the strength and appearance of the disk.

Another object of this invention is to provide a novel combination ornamental and cushioning bead for an ornamental wheel disk.

In accordance with the general features of my invention there is provided a novel method of applying an ornamental bead to a wheel disk which consists in forming an outer portion of the disk with a groove, snapping the edge of a turned portion of a bead of curved cross-sectional shape into the groove, and seaming the outer edge of the disk with said edge of the bead interlocked therewith.

A further feature of my method relates to the compressing of a rubber strip into the turned portion of the bead between the bead and the seam so as to provide a cushioning member for the disk at its outer marginal portion.

Also in accordance with the teachings of the present invention there is provided a novel ornamental bead structure in which a bead of curved transverse cross-sectional shape has its inner edge sprung into a groove in the disk and lock-seamed with the disk, there being a rubber bead inside of the groove between the ornamental bead and the lock seam, and which rubber cushioning bead has a portion overlying and extending beyond the seam for yieldable contact with a portion of a wheel to which the disk may be applied.

Other objects and features of this invention will more fully appear from the following detailed description taken in connection with the accompanying drawing which illustrates a single embodiment thereof, and in which Figure 1 is a front view of an ornamental wheel disk structure embodying the teachings of this invention.

Figure 2 is an enlarged fragmentary cross-sectional view taken on the line II—II of Figure 1 looking in the direction indicated by the arrows.

Figures 3 and 4 are fragmentary sectional views illustrating steps of my novel method of applying the bead to the disk, the rubber cushioning strip being illustrated in dotted lines in Figure 4.

Figure 5 is a detail view looking at the rear of a portion of the disk showing the shape and construction of one of the spring elements for holding the disk on the wheel.

As shown on the drawing:

It is thought that my novel method of applying an ornamental bead to a wheel disk will be fully understood from a description of a wheel disk structure embodying an ornamental bead fabricated in accordance with the steps of my novel method.

The reference character 10 designates generally a drop center wheel rim which includes a base flange 11 opposite intermediate flanges 12 and turned edges 13. This wheel rim is adapted to accommodate the usual tire and tube 15 which has a valve stem 16 projecting through an opening 17 in the outer side of the rim adjacent the base flange 11.

The wheel rim 10 is connected by a double set of spokes 18 and 19 to a hollow central hub 20 which includes the usual central flange 21 adapted to be secured by bolt or cap screws 22 to a supporting member such as a vehicle part 23. The wheel hub 20 includes an outer central opening defined by an edge 24 in which opening a conventional hub cap 25 is adapted to be snapped.

Disposed over the outer side of the wheel is an ornamental wheel disk of relatively thin sheet material such as metallic sheet and which disk is designated generally by the reference numeral 26. The novel mechanical features of this disk other than the beaded structure at its outer periphery are being covered in a separate co-pending patent application.

The disk is of a curved convex shape and may be formed in any suitable way such as by spinning or on a punch press.

The inner peripheral margin of the disk 26 is bulged outwardly at 27 but has its innermost extremity 28 spaced from the outer edge of the wheel hub 20. Secured to the rear side of the disk by any suitable means such, for example, as by projection welds, are a plurality of radially extending spring elements 30 each of which has its outer end secured at 31 to the disk 26 and has its innermost free end turned outwardly at 32. I find that by turning the inner edge of each of these elements outwardly, the elements may be slipped easily over the outer inclined peripheral surface 33 of the wheel hub but will thereafter upon any tendency of the disk to become loose bite or grip more tightly the surface 33 of the wheel hub.

The arrangement of these elements 30, which elements may be of any suitable number, is such that the disk may be easily shoved into position over the wheel hub. Once these elements, however, are in engagement with the inclined wheel hub surface 33 any force tending to dislodge the disk only results in the elements gripping more tightly the inclined surface 33 thus insuring that the disk will at all times be tightly held in position on the wheel.

Now in accordance with the features of my present invention, the outer edge of the disk is initially turned as indicated at 40 so as to provide an annular groove or depression 41 which faces outwardly. This turning of the edge 40 which provides a groove 41 may be accomplished by any suitable press operation prior to the application of the molding bead or strip 42 or the securement of the same to the disk.

The molding bead or strip 42 may be made of any suitable material such, for example, as from a strip of springy metallic material and is of a curved cross-sectional shape. This bead may be formed on any standard rolling machinery. While it is in the form of a ring, it is not a continuous ring but is split as indicated at 43, in Figure 1.

The outer edge of the metallic bead 42 is turned upon itself as indicated at 44 so as to prevent one from cutting his or her hand on this edge. The inner edge of the metallic bead 42 is also turned as indicated at 45 and has a normal diameter slightly larger than the diameter of the groove 41 of the disk so that this edge 45 of the bead has to be sprung into the groove. This action is possible by reason of the fact that the bead 42 is split and is contractible and expansible.

After the edge 45 of the bead has been disposed in the groove 41 the fabricated structure is inserted in a rolling machine in which machine the edge 40 is lock seamed with the edge 45 as shown in Figure 4. This results in the bead becoming an integral part of the outer margin of the disk 26.

In the commercial production of this structure the disk may be furnished in color and the molding strip 42 may be buffed before the two are attached. After the attachment there will of course be a slight variable distance between the ends of the split ring 42 and in some cases this gap, which is designated by the reference numeral 43, may be as much as a quarter of an inch. The bead at this gap 43 may then be notched out as indicated at 48 in Figure 1 so as to permit the valve stem 16 to project therethrough. A second press operation may also be employed to turn the edges of the cut-out 48 as indicated at 49 in Figure 2, thus giving the bead a better appearance.

After the bead has been interlocked with the outer edge of the disk the rubber strip bead such as the one shown in dotted lines in Figure 4 and which is designated by the reference numeral 50 is compressed in the groove 41. This rubber bead may be made of soft rubber and is of a double tube construction. In other words the rubber strip 50 has a cross-sectional shape resembling a number 8. The smaller tube 51 of this rubber bead is compressed in the groove 41 between the bead 42 and the lock seamed edges of the bead and disk. The outer or larger tube portion 52 extends outwardly alongside the inner surface of the bead 42 and overhangs the lock seamed edges as will be evident from Figure 4. In other words this portion 52 of the rubber bead is in a position to be compressed against a flange of a wheel rim to provide for a cushioned engagement between the outer periphery of the disk and the wheel as is evident from Figure 2.

Also the smaller tube portion of the rubber strip 50 may have disposed in it a continuous wire ring 54 which has a diameter slightly less than the diameter of the outermost extremity of the lock seamed edges of the bead and disk. The smaller or reduced portion 51 of the rubber tube is progressively forced or compressed in the groove 41 and once the same is completely in the groove the wire ring 54 acts to resist any tendency to dislodge the rubber from its seat in the beaded structure.

It is thought that my novel method of applying the bead to the disk will be fully understood from the foregoing description of a beaded structure made in accordance with the steps of my method.

I am aware that many changes may be made and numerous details of construction may be varied through a wide range without departing from the principles of this invention, and I, therefore, do not purpose limiting the patent granted hereon otherwise than necessitated by the prior art.

I claim as my invention:

1. The method of applying an ornamental bead to a wheel disk which consists in providing the outer portion of the disk with a groove, inserting the edge of a turned portion of a bead having a body of curved cross-sectional shape into said groove, seaming the outer edge of the disk, and compressing a rubber strip into the turned portion of the bead between the body of the bead and said seam.

2. The method of applying an ornamental bead to a wheel disk which consists in providing the outer portion of the disk with a groove, snapping the edge of a turned portion of a bead of curved cross-sectional shape into said groove, seaming the outer edge of the disk with said edge of the bead interlocked therewith, and compressing a tubular rubber strip into the turned portion of the bead between the bead and said seam with a portion of the rubber strip projecting outwardly over the edge of the seam to provide for a cushioned contact between the outer portion of the disk and a wheel part.

3. The method of applying an ornamental bead to a wheel disk which consists in forming an outer portion of the disk with a circular depression, springing the edge of a turned portion of a circular bead having a body of curved cross-sectional shape into said depression, lock-seaming the outer edge of the disk with the edge of the bead, and compressing the smaller tube of a double-tube rubber strip having a cross-sectional shape resembling a numeral 8 into said depression between the body of the bead and the lock seam with the larger tube of said rubber strip overhanging said lock seam.

4. An ornamental bead structure for a wheel disk comprising a circular bead of curved cross-sectional shape having an inner turned edge sprung into a circular groove defined by a turned outer edge of the disk, said turned outer edge of the disk being lock-seamed with the inner edge of the bead, and a rubber cushioning strip having an inner portion compressed between said bead and the lock seam edges, all in a manner that said bead conceals said strip.

5. An ornamental bead structure for a wheel disk comprising a circular bead of curved cross-sectional shape having an inner turned edge sprung into a circular groove defined by a turned outer edge of the disk, said turned outer edge of the disk being lock-seamed with the inner edge of the bead, and a rubber cushioning strip having an inner portion compressed between said bead and the lock seam edges, said rubber strip also having a larger outer portion extending over the inner surface of the bead and overhanging the lock seam edges.

6. An ornamental bead structure for a wheel disk comprising a circular bead of curved cross-sectional shape having an inner turned edge sprung into a circular groove defined by a turned outer edge of the disk, said turned outer edge of the disk being lock-seamed with the inner edge of the bead, and a rubber cushioning strip having an inner portion compressed between said bead and the lock seam edges, said rubber bead strip comprising a double tube having a cross-sectional shape resembling a numeral 8 with the smaller tube compressed between the bead and the lock seamed edges, and with the larger tube overhanging the outer extremity of the lock seam edges so as to provide for a cushioning contact between the outer marginal portion of the disk and a wheel with which the disk may be associated.

7. An ornamental bead and wheel disk structure including a wheel disk having its peripheral margin turned to define a groove, a split-ring bead having an outwardly arched body and its inner peripheral margin arcuately rolled to define an annular groove, said bead being secured into the groove of the disk and the turned margin of the disk being lock-seamed into the groove of the bead to unite the parts and define a groove between the body of the bead and the seam.

8. An ornamental bead and wheel disk structure, including a wheel disk having its peripheral margin turned to define a groove, a bead having its inner peripheral margin arcuately rolled to define a groove, the turned margin of the disk being lock-seamed into the groove of the bead to unite the parts with the bead extending radially outwardly beyond the disk, and a cushioning element held by the groove in said bead inside the lock seam and concealed behind said bead when the structure is on a wheel.

GEORGE ALBERT LYON.